United States Patent [19]
Wagner

[11] Patent Number: 4,969,674
[45] Date of Patent: Nov. 13, 1990

[54] RESILIENT VEHICLE SIDE BUMPER

[76] Inventor: Scott J. Wagner, 28 Westwood Dr., Fort Madison, Iowa 52627

[21] Appl. No.: 289,015

[22] Filed: Aug. 11, 1989

[51] Int. Cl.⁵ .......................................... B60R 19/42
[52] U.S. Cl. ................................. 293/128; 293/155; 280/770
[58] Field of Search ............... 293/108, 126, 127, 128, 293/155; 280/770; 296/207; 52/716; 403/339, 331, 381, 353

[56] References Cited

U.S. PATENT DOCUMENTS

| | | | |
|---|---|---|---|
| 3,506,294 | 4/1970 | Newman | 293/128 |
| 4,304,073 | 12/1981 | Reith | 52/716 |
| 4,674,783 | 6/1987 | Hogan | 293/128 |
| 4,707,008 | 11/1987 | Falco | 52/716 |
| 4,726,614 | 2/1988 | Myers et al. | 293/128 |
| 4,796,935 | 1/1989 | Maraia | 280/770 |
| 4,828,302 | 5/1989 | Marasigan | 293/128 |
| 4,828,303 | 5/1989 | Soria | 293/128 |

FOREIGN PATENT DOCUMENTS 0536596  4/1955  Belgium .............................. 403/381

*Primary Examiner*—Andres Kashnikow
*Assistant Examiner*—Mark T. Le
*Attorney, Agent, or Firm*—Kent A. Herink

[57] ABSTRACT

A resilient vehicle side bumper including a resilient body member having a male portion and a female portion. Coacting end portions of the male and female portions are releasably joinable at a plurality of selected positions to form the body member at a selected length. A rotatable locking tab extends from the back of vehicle side of the male and female portions for releasably locking the side bumper to the vehicle. A plurality of suction cups and magnet strips on the vehicle side of the male and female portions releasably adhere the body member to the vehicle.

6 Claims, 4 Drawing Sheets

RESILIENT VEHICLE SIDE BUMPER

BACKGROUND OF THE INVENTION

This invention relates to resilient bumpers for the sides of vehicles and, more particularly, to a resilient bumper of adjustable length for releasable attachment to the side doors of a vehicle for protection of the vehicle against damage from impact of a door of another vehicle or the like.

To conserve the amount of space required for parking vehicles, owners of parking ramps and parking lots, as well as civil engineers who design municipal parking areas, make the sizes of individual parking places relatively narrow. As a result, adjacent vehicles are usually so close that an uncarefully opened door of one vehicle will come into contact with the side of an adjacent vehicle. If the contact is sufficient violent, the finish of one or both vehicles may be damaged, a dent may be made in the side of the contacted vehicle, or both. While many vehicles are provided with a fixed body side molding intended to protect the side of the vehicle, such moldings are often not in the appropriate position to prevent damage from contact with another vehicle door or the like.

Flexibility in positioning a side bumper is, accordingly, desirable. It is also desirable, however, to prevent theft of the side bumper from the vehicle. Moreover, vehicles vary greatly in the size and shape and contour of their sides and doors so that any side bumper must be adaptable to be usable with the variety of different vehicles.

A number of attempts have been made to provide side bumpers for vehicles. One such bumper is disclosed in U.S. Pat. No. 3,472,546, which teaches a side bumper made of resilient material to the end portions of which are secured retaining hooks for attachment of the side bumper to edges of a door panel of the vehicle. Another side bumper is taught in U.S. Pat. No. 2,734,765, which uses a combination of suction cups and hooks for releasable attachment to a side door of a vehicle. A side bumper which uses both suction cups and magnets, and which is releasably held at edges of the vehicle doors, is disclosed in U.S. Pat. No. 4,707,008, which can be used on both ferrous and nonferrous vehicles.

None of the prior art devices, however, are of adjustable length to accommodate a variety of vehicle door sizes and shapes. Further, while the '008 patent does describe a locking device which will prevent theft of the device off of a vehicle, the locking device is relatively inflexible to anything but vertical edge contours of vehicles doors.

The present invention is of an adjustable length to accommodate vehicle doors of a variety of dimensions and includes means for releasably locking the device to a vehicle having other than vertical door edge contours.

SUMMARY OF THE INVENTION

The present invention is a resilient side bumper for vehicles and includes a main body member made of molded or extruded resilient material such as plastic or rubber. The body member has a forward portion and a rearward portion adjustably attached thereto to selectively alter the length of the main body member. The forward portion and the rearward portion are each provided with a locking device which extends downwardly from the bottom surface of each portion toward the vehicle. Additionally, a plurality of suction cups and magnet strips are attached to the bottom surface of each of the forward portion and the rearward portion.

The resilient side bumper is attached to a side door or adjacent fender of a vehicle by insertion of the locking device of the forward portion into the gap between the front bumper of the vehicle and the open side door of the vehicle. The length of the resilient side bumper is adjusted so that the locking device of the rearward portion is adjacent the rearward edge of the side door. When the side door of the vehicle is closed, the locking members prevent removal of the side bumper from the vehicle. The locking devices are rotatable relative to the forward and rearward portions of the main body member to adjust to nonvertical door edges.

DETAILED DESCRIPTION OF A PREFERRED EMBODIMENT

Figure 1:
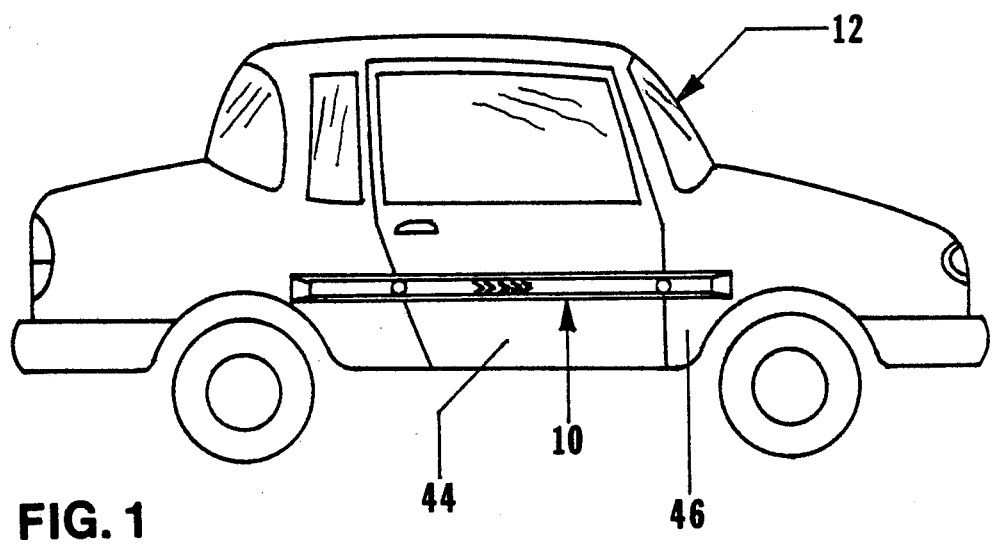
FIG. 1 is a side view of a vehicle on which has been mounted a pair of resilient side bumpers of the present invention and which depicts both sides of the vehicle in that the other side is identical except facing in the other direction.

Illustrated in FIG. 1, generally at 10, is a resilient vehicle side bumper attached to the side of a passenger vehicle 12. The side bumper 10 includes a forward portion 14 and a rearward portion 16 which are of a resilient material that has been preferably molded to a shape which tapers from the bottom surface to the top surface thereof. In a preferred embodiment of the invention, the forward and rearward portions are made of three layers of different resiliency. The top 18 and bottom 20 layers are of a flexible but relatively nondeformable plastic. The intermediate layer 22 is a relatively soft and easily deformable plastic.

Figure 2:
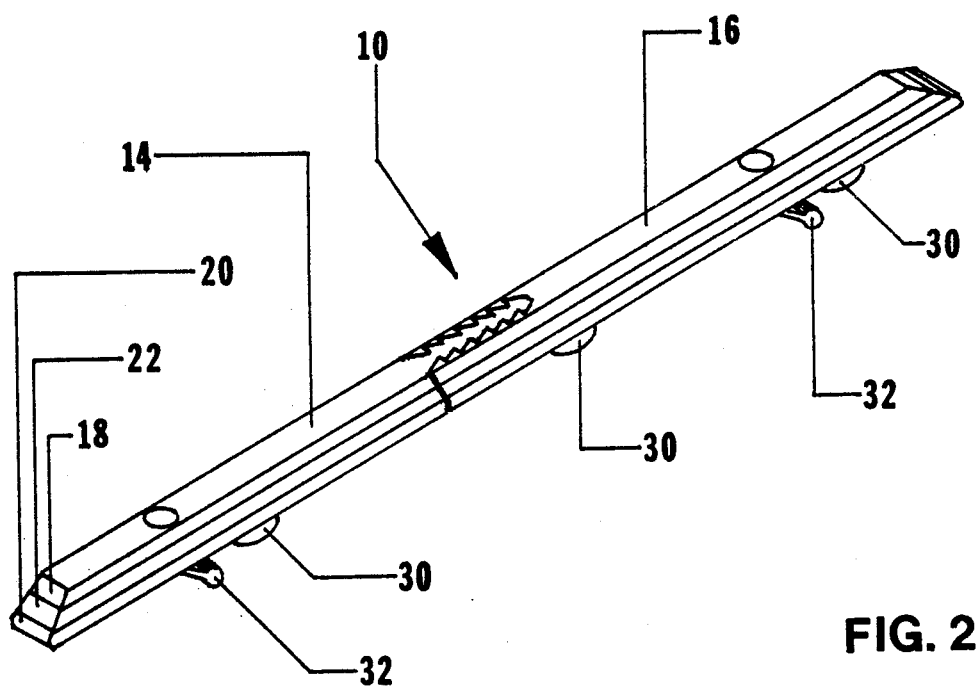
FIG. 2 is a perspective view of the resilient side bumper.
Figure 3:
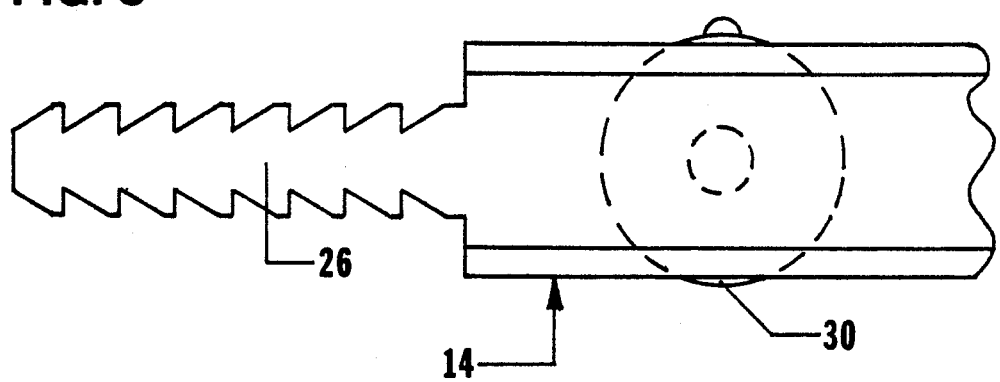
FIG. 3 is a partial plan view of the male portion of the resilient side bumper.
Figure 4:
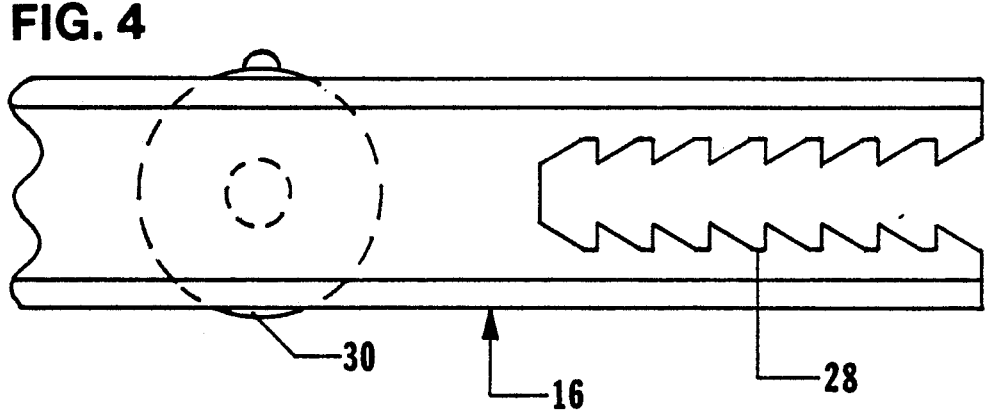
FIG. 4 is a partial plan view of the female portion of the resilient side bumper.
Figure 5:
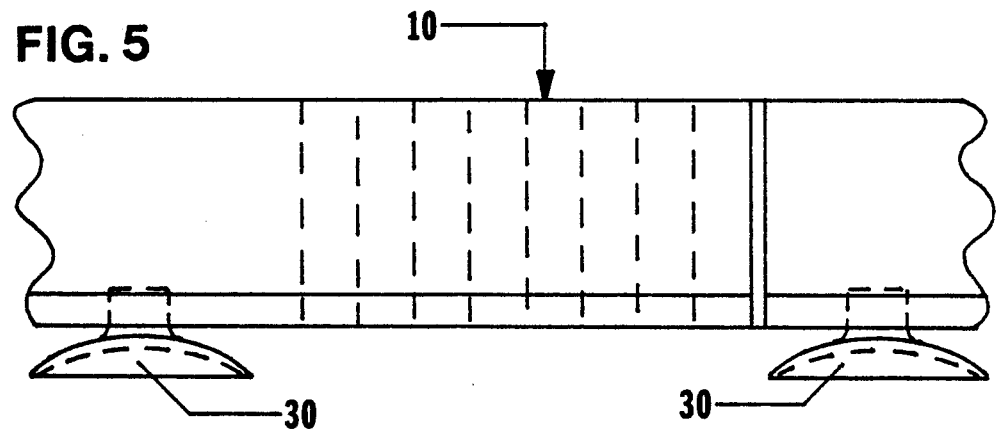
FIG. 5 is a partial side view of the forward and rearward portions assembled together.

As is best illustrated in FIG. 3, the male portion 14 terminates at one end in a serrated male member 26. As illustrated in FIG. 4, the female portion 16 terminates with a correspondingly serrated female member 28. The male member 26 is receivable inside the female member at any one of the plurality of serrations, as illustrated in FIG. 2, to provide a means for adjusting the length of the side bumper 10. The male portion 14 and female portion 16 are assembled together by positioning one of the portions above the other at the appropriate length position and pressing the two together until their upper and lower surfaces coincide, as illustrated in FIG. 5. Alternatively, the serrated male portion 26 and the serrated female portion 28 may be foreshortened to selectively adjust the length of the bumper 10 when the male and female portions 14 and 16 are assembled together as described.

Also included in the side bumper 10 are a plurality of suction cups 30 which extend below the bottom surface of the side bumper 10 and function to assist in the releasable attachment of the side bumper 10 to a vehicle 12 as will be discussed in more detail below.

Figure 6:
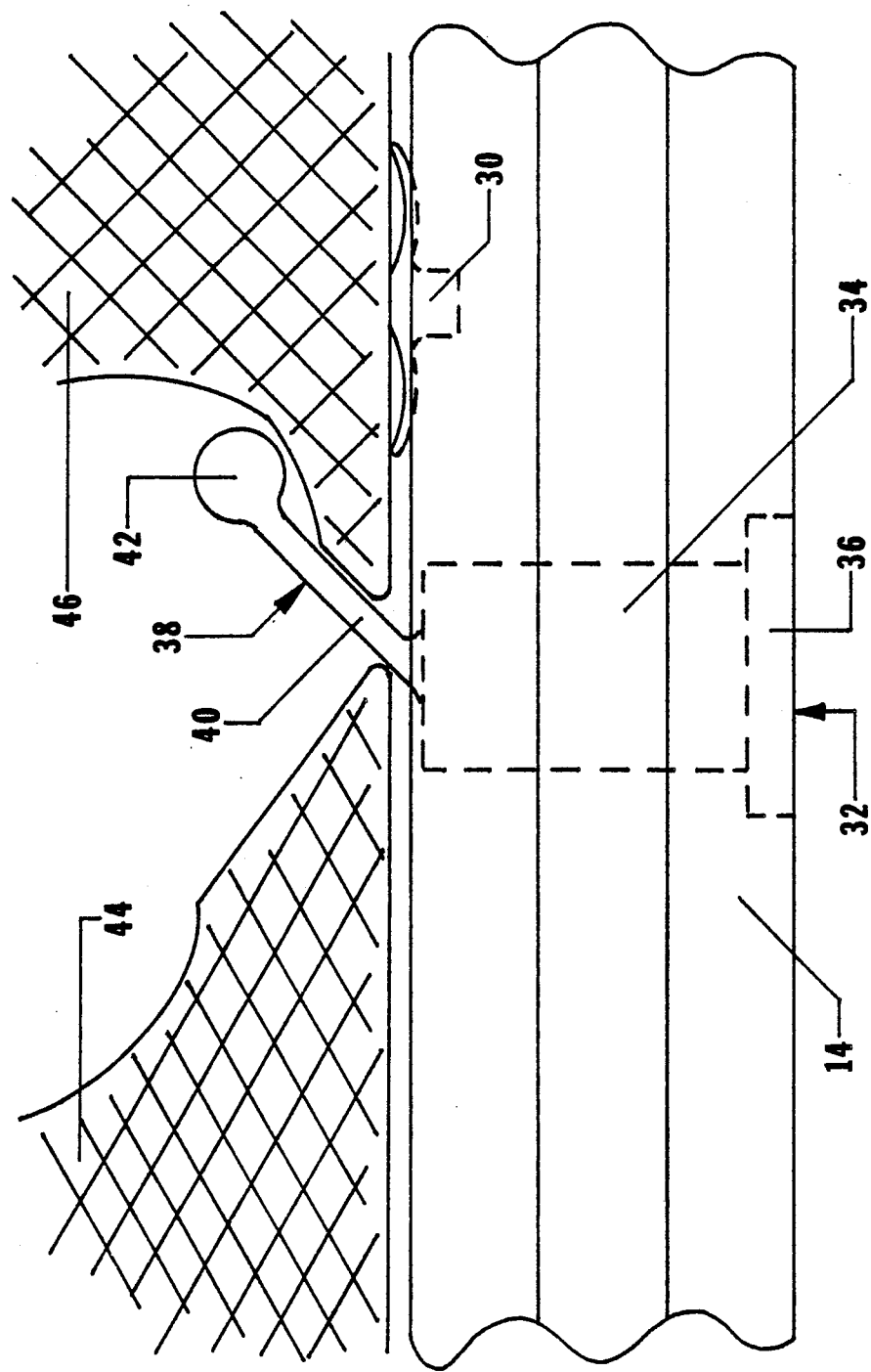
FIG. 6 is an enlarged side view of the forward portion of the resilient side bumper showing capture of the locking device between the forward edge of a door of the vehicle and the front fender.
Figure 7:
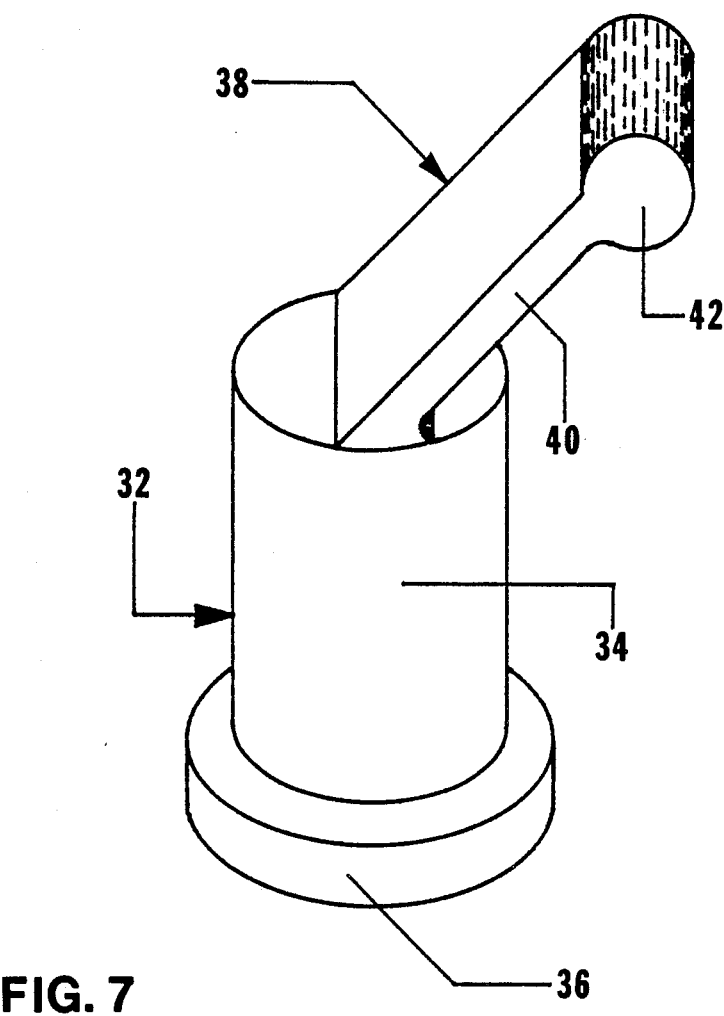
FIG. 7 is an enlarged perspective view of the locking device.

The structure of the side bumper is completed by a pair of locking devices or tabs 32 (FIGS. 6 and 7). A cylindrical main body portion 34 of the locking device 32 terminates in a cylindrical end cap 36. At the opposite end, a locking ear 38 extends outwardly from the main body portion 34 at an angle. The locking ear 38 consists of a web portion 40 and a bulbous end portion 42 which has a transverse dimension greater than the thickness of the web portion 40.

The locking device 32 is insertable into the male and female portions of the side bumper 10, as illustrated in FIG. 6. When attached to a vehicle, the locking ear 38 of the locking device 32 extends into the gap between a side door 44 and a fender 46 of the vehicle. When the door is open (not shown), the gap between the side door 44 and the front fender 46 is sufficient to allow the bulbous end portion 42 of the locking device 32 to be inserted behind the door 44. When the door 44 is closed (FIG. 6), the side bumper 10 cannot be detached from the vehicle because the bulbous end portion 42 is too large to be extracted through the gap between the fender 46 and the closed side door 44. Also, when attached to the vehicle, the suction cups 30 are pressed onto the surface of the vehicle to releasably secure the side bumper 10 to the vehicle. In a similar manner, the locking device 32 of the female portion 16 is retained behind the rearward edge of the side door 44 and the adjacent fender of the vehicle.

As illustrated in FIG. 1, the contour of one or both of the edges of the side door may be other than vertical. In such event, the locking device 32 can be rotated relative to the side bumper 10 so that the web portion 40 of the locking device 32 is parallel to the edge contour of the door at the desired location of the side bumper 10.

The foregoing description of a preferred embodiment has described the male portion 14 as including the serrated male member 26 and the female portion 16 as including the female member 28. Of course, the side bumper 10 could be positioned on the vehicle such that that male member 26 was on the portion of the side bumper 10 that was rearward and the female member 28 would be on the portion of the side bumper 10 that was located forwardly of the vehicle 12.

Although the foregoing description of a preferred embodiment has been described in particular detail, it will be understood that variations and modifications may be effected without departing from the spirit and scope of the intention as defined in the following claims:

I claim:

1. A resilient vehicle side bumper, comprising:
   (a) a resilient body member having a male portion and a female portion;
   (b) coating sawtooth end portions of said male and female portions for releasably joining said male and female portions at one of a plurality of mating positions of said sawtooth portions to form said resilient body member of a selected length;
   (c) rotatable locking means extended from the back of each of said male and female portions for releasably locking the side bumper to the vehicle by selective rotation of said locking means to correspond to the contour of a door of the vehicle at the location of said locking means; and
   (d) a plurality of releasable attachment means on the back of said body member for releasably adhering said body member to the vehicle.

2. A resilient vehicle side bumper for attachment to a door of a vehicle, comprising:
   (a) a resilient body member having a male portion and a female portion;
   (b) coating sawtooth means on adjacent end portions of said male and female portions for selectively adjusting the length of said body member;
   (c) rotatable locking tabs extended from the rear of each of said male and female portions;
   (d) enlarged end portions of said rotatable locking tabs for capture thereof by a closed door of the vehicle; and
   (e) a plurality of releasable adhesive means on the rear of said male and female portions for releasably adhering said body member to the side of the vehicle.

3. A resilient vehicle side bumper as defined in claim 1, wherein:
   (a) the vehicle includes a pair of side doors movable between an open and a closed position, pair of forward fenders, and a pair of rearward fenders;
   (b) said locking means include enlarged end portions; and
   (c) said side doors in the closed position therefor are separated from said fenders by a distance less than said enlarged end portions.

4. A resilient vehicle side bumper as defined in claim 1, wherein:
   (a) the vehicle includes two pair of side doors movable between an open and closed position, a pair of forward fenders, and a pair of rearward fenders; and
   (b) said locking means include enlarged end portions; and
   (c) said side doors in the closed position therefor are separated from said fenders and said adjacent side doors by a distance less than said enlarged end portions.

5. A resilient vehicle side bumper as defined in claim 2, wherein:
   (a) the vehicle includes at least a pair of fenders adjacent said side doors and separated therefrom along a contour; and
   (b) said rotatable locking devices are rotatably movable to conform to said contour.

6. A resilient vehicle side bumper as defined in claim 1, wherein:
   (a) said coacting end portions are foreshortened for forming a correspondingly foreshortened body member.

* * * * *